July 14, 1953 — J R. MORGAN — 2,645,520

FASTENER FOR HINGED TAIL GATES

Filed June 23, 1952

INVENTOR.
J. R. Morgan
BY
Searman & Searman
ATTORNEYS

Patented July 14, 1953

2,645,520

UNITED STATES PATENT OFFICE 2,645,520

FASTENER FOR HINGED TAIL GATES

J R. Morgan, Barryton, Mich.

Application June 23, 1952, Serial No. 295,077

2 Claims. (Cl. 296—57)

This invention relates to fastening devices for the hinged or pivoted tail gates of trucks, trailers and vehicles in general.

One of the prime objects of the instant invention is to design a simple fastening mechanism by means of which hinged tail gates may be swung and held in closed, locked position, without fear of accidental opening, and which can also be readily and quickly manipulated to permit the gate to be swung down and held in horizontal open position, even when heavy loads are placed thereon.

Another object is to design a simple and economical mechanism by means of which the tail gate can be swung from open to closed position without the necessity of grasping the linkage on each side of the gate to swing it out of longitudinally aligned dead center relationship, which can be locked in closed position by merely swinging the mechanism down to depending position.

A further object is to provide a fastening device composed of few parts, all of which can be inexpensively manufactured and assembled, and which firmly holds the tail gate in adjusted position.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion, and minor details of construction, without departing from the spirit, or sacrificing any of the advantages of the invention.

Figure 1:
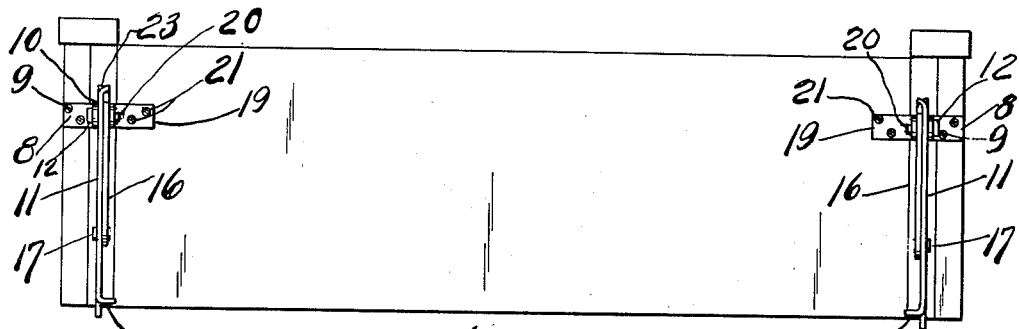
Fig. 1 is a rear elevational view of a conventional truck body having a tail gate equipped with the fastening device of the present invention.
Figure 2:
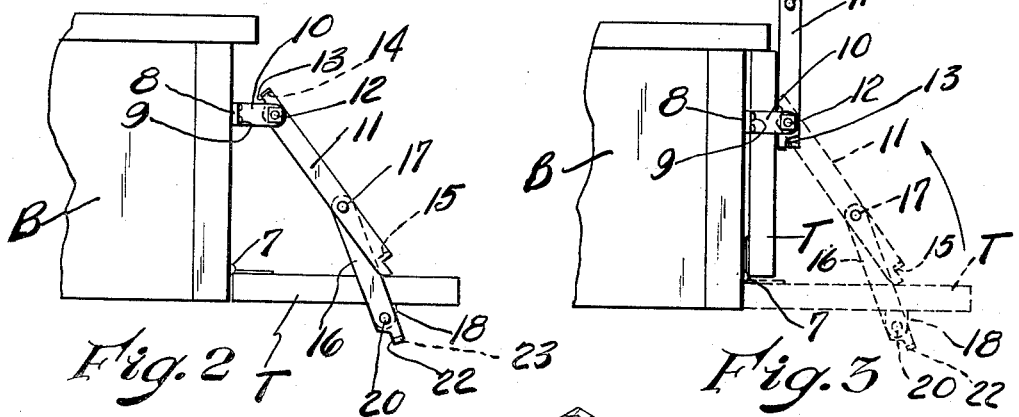
Fig. 2 is a side elevational view showing the tail gate in open position.
Figure 3:
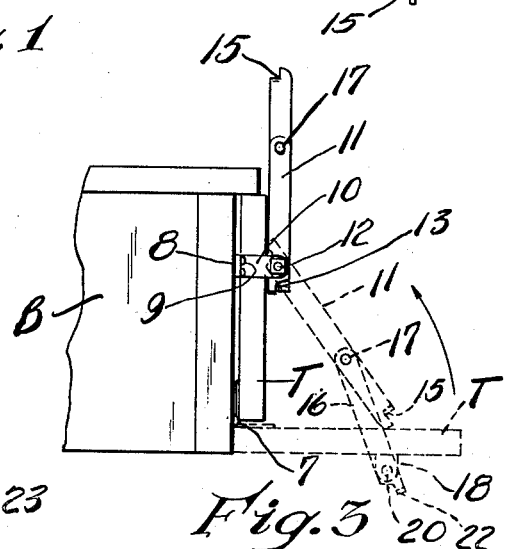
Fig. 3 is a view similar to Fig. 2, the broken lines showing the tail gate in open position, the solid lines showing it swung up.

Referring now more particularly to the drawing in which I have shown the preferred embodiment of my invention, the letter B generally indicates the frame of a conventional truck or body having a tail gate T hingedly or pivotally connected thereto as at 7 so that it may be readily swung from open to closed position and vice versa.

Angularly shaped hinge brackets 8 are secured to the ends of the side walls of the body B by means of screws or bolts 9 or the like, the free end 10 of said bracket projecting outwardly as shown, and a link 11 is pivotally connected thereto at a point spaced from the one end thereof by means of bolts 12, the upper end of the link being cut away as at 13, with the tip end turned at right angles to the main body as at 14, and for a purpose to be presently described. It will, of course, be understood that the linkage on both ends of the gate is identical, and a description of but one will suffice for both.

Figure 4:
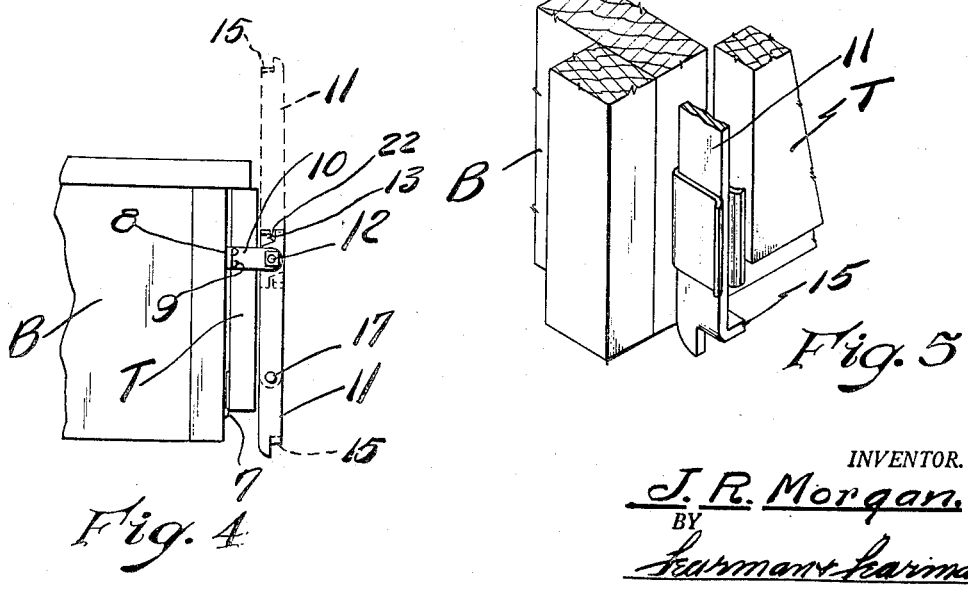
Fig. 4 is also a view similar to Fig. 2, the broken lines showing the linkage swung up to close the gate, the solid lines showing the linkage swung down to locked position.

The opposite end of the link 11 is split similar to the section 14 as at 15, and one end of a link 16 is pivotally connected to the link 11 at a point intermediate its length by means of the pin 17, the lower end of the link 16 being pivotally connected at a point spaced from its lower end to the projecting arm 18 of a bracket 19 by means of hinge pin 20, said bracket being secured to the face of the tail gate T by means of screws 21 or the like, the lower end of the link being cut away as at 22 and is turned as at 23 as shown, these cut away sections 13 and 22 permitting the links 11 and 16 to be swung to parallel relation with each other when the tail gate is swung to closed position, all as shown in broken lines in Figs. 1 and 4 of the drawing.

I wish to direct particular attention to the fact that when the tail gate is swung open, the links 11 and 16 are not in true longitudinal alignment, the turned end 15 of the link 16 engaging the edge of the link 11, so that when it is desired to close the gate, it is merely necessary to grasp the gate and swing it upwardly, and this is possible because the links 11 and 16 are not in direct alignment; they are held at an angle with relation to each other and prevented from reaching the dead center position by reason of the end 15 of the link 16 engaging the edge of link 11 as above described.

When the gate is in its raised position, the links 11 and 16 will be in true face-to-face parallel relation, the cut away sections 13 and 22 of the links 11 and 16 accommodating the turned tips 14 and 23, so that when the gate is in closed or raised position, the hinge pins 12 and 20 will be in direct horizontal alignment with the links in raised position as clearly shown in broken lines in Fig. 4 of the drawing, and by swinging the links downwardly as indicated in solid lines in the same figure, the tail gate will be securely locked until the links are again swung up to permit the gate to be swung down. In this locked position, the gate is prevented from swinging down by the turned end 13 of the link 11 which prevents rearward movement of the link 16. When the links 11 and 16 are swung up to the vertical position shown in dotted lines in Fig. 4, the link 16 is of course free to pivot.

Figure 5:
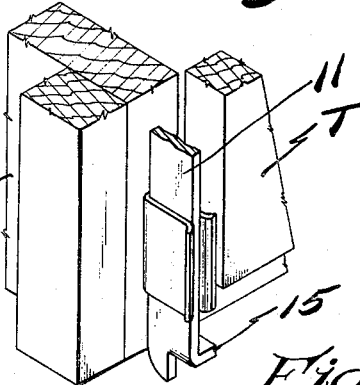
Fig. 5 is an enlarged, fragmentary, perspective view showing the tail gate swung up, with a resilient clip for holding the linkage against rattle etc.

In Fig. 5 of the drawing I have shown means to prevent rattling and/or swinging movement of the links when in locked position, said means comprising a resilient U-shaped bracket 25 secured to the body by means of screws or the like (not shown) the end of the link 11 being frictionally and releasably secured in said bracket. However, use of this bracket is at the option of the manufacturer.

From the foregoing description, it will be clearly obvious that I have perfected a very simple, practical and economical fastening means for hinged tail gates for vehicles in general.

What I claim is:

1. The combination with a vehicle body having a hinged tail gate, of a locking means therefor comprising a link having an end pivotally connected to said vehicle body adjacent the upper end of said tail gate, a second link having an end section pivotally connected to said tail gate at a point in horizontal alignment with the point of connection of said first-mentioned link when said tail gate is in vertical, closed position and said links are in vertical parallel relationship, said end section extending beyond the point of connection to the tail gate and being formed with an inwardly bent, reduced portion, the opposite end of said second link being pivotally connected to said first-mentioned link, the connected end of said first-mentioned link extending beyond the point of connection and a portion thereof being turned inwardly to engage the inwardly bent portion of the second link limit pivotal movement of said second link when said tail gate is in closed position and said links are in parallel relationship and have been swung down to locked position.

2. The combination with a vehicle body having a hinged tail gate, of a locking linkage means therefor, comprising a bracket mounted on the vehicle body adjacent the upper end of said tail gate, a second bracket mounted on said tail gate in horizontal alignment with said first-mentioned bracket when said tail gate is in closed position, an outer link having an end pivotally connected to said first bracket, an inner link having one end pivotally connected to said second bracket and its opposite end pivotally connected to said outer link interjacent the ends thereof, the bracket connected end of said inner link extending beyond the point of connection and being formed with a cut-out therein, the connected end of said outer link extending beyond the point of connection and being formed with an inwardly bent, reduced portion accommodated in said cut-out when said links are in parallel relation, the reduced portion of said outer link limiting rearward movement of said inner link when said tail gate is in closed position and said parallelly disposed links have been swung down to locked position, and a resilient clip means adjacent the lower edge of said tail gate to frictionally hold the links in locked position.

J. R. MORGAN.

References Cited in the file of this patent
UNITED STATES PATENTS

| Number | Name | Date |
|---|---|---|
| 1,352,711 | Waters | Sept. 14, 1920 |
| 2,226,824 | Larson | Dec. 31, 1940 |
| 2,257,530 | Orscheln | Sept. 30, 1941 |
| 2,364,648 | Olson | Dec. 12, 1944 |